United States Patent

[11] 3,627,072

[72] Inventor Richard L. Smirl
La Grange Park, Ill.
[21] Appl. No. 830,711
[22] Filed June 5, 1969
[45] Patented Dec. 14, 1971
[73] Assignee Borg-Warner Corporation
Chicago, Ill.

[54] PLURAL OUTPUT PATH TORQUE TRANSMITTING MECHANISM—HYDRAULIC CLUTCH FOR FOUR WHEEL DRIVE VEHICLES
15 Claims, 3 Drawing Figs.

[52] U.S. Cl...................................... 180/44,
74/711, 180/24.09, 192/3.57
[51] Int. Cl............................................. B60k 17/34
[50] Field of Search........................................... 180/44, 22
K, 24.09

[56] References Cited
UNITED STATES PATENTS

| | | | |
|---|---|---|---|
| 2,158,320 | 5/1939 | Bock............................ | 180/22 K X |
| 3,191,708 | 6/1965 | Simonds et al................ | 180/44 |
| 3,400,777 | 9/1968 | Hill.............................. | 180/44 |

Primary Examiner—A. Harry Levy
Attorneys—Donald W. Banner, William S. McCurry and John W. Butcher ABSTRACT: A multiple output path drive system for a vehicle having plural pairs of traction wheels including a torque transfer mechanism adapted to receive an input torque which incorporates a differential gear mechanism adapted to distribute the input torque to a plurality of drive axles and a fluid pressure responsive clutch between the differential gear mechanism and at least one drive axle in fluid communication with a pressure source of an automatic transmission, the clutch and fluid pressure source adapted to urge the clutch into a fully engaged condition only when the transmission is in a forward mode of operation.

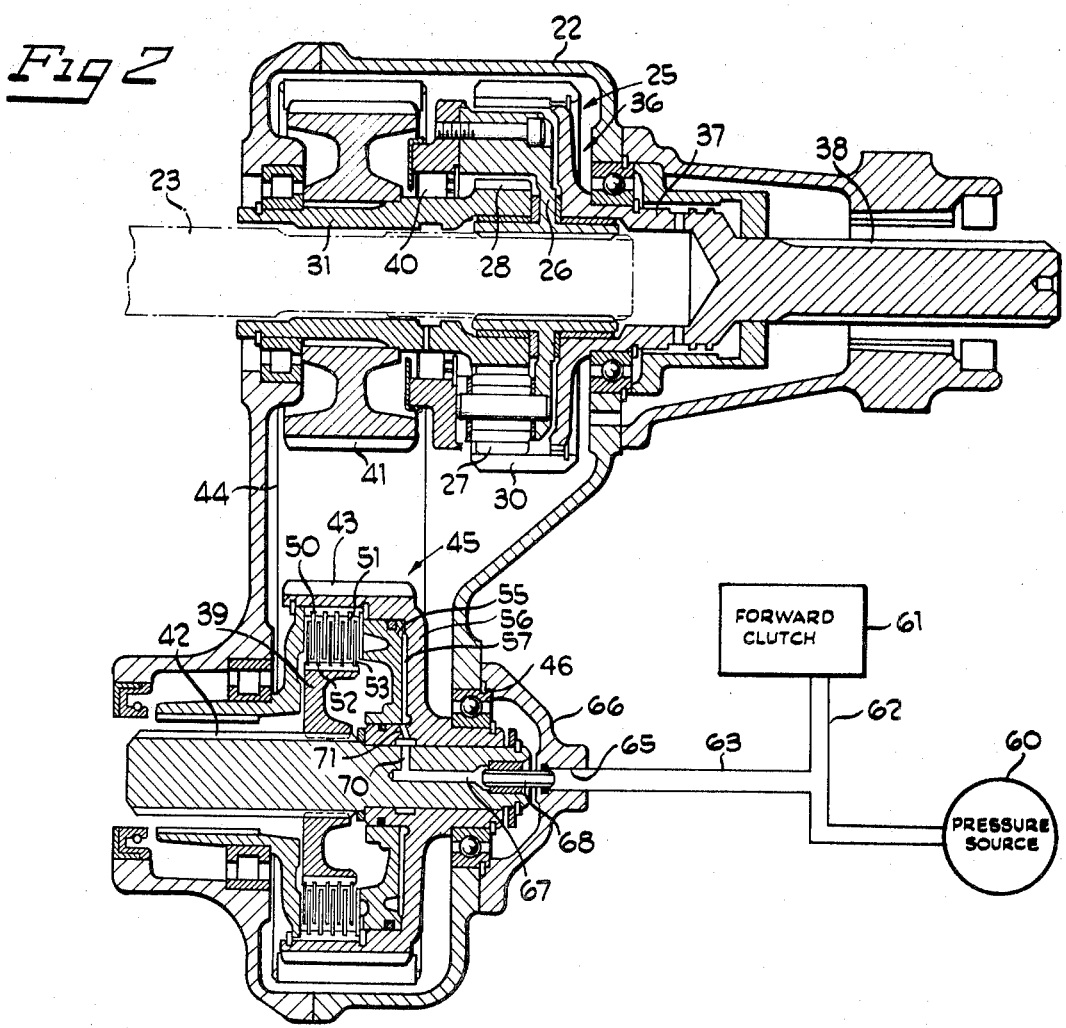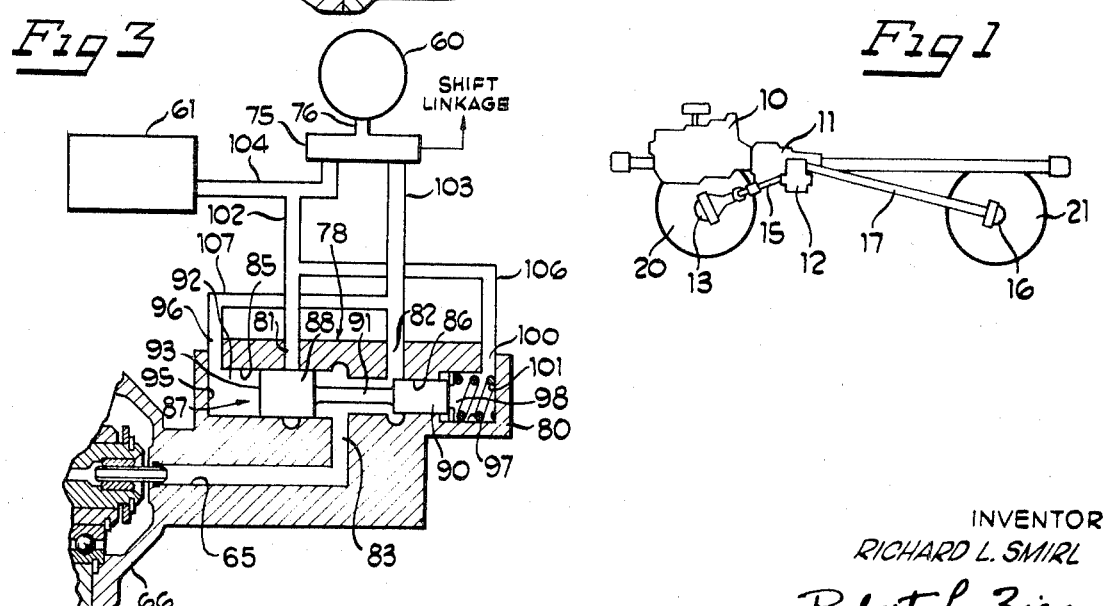
INVENTOR
RICHARD L. SMIRL
BY Robert L. Zieg
ATTORNEY

PLURAL OUTPUT PATH TORQUE TRANSMITTING MECHANISM—HYDRAULIC CLUTCH FOR FOUR WHEEL DRIVE VEHICLES

SUMMARY OF THE INVENTION

This invention relates to multiple path drive systems, for example, a four wheel drive system, and more particularly, to a system including a torque transfer mechanism adapted to receive an input torque from a prime mover and to transmit torque to a plurality of drive axles. The torque transfer mechanism includes a differential mechanism having a pair of output shafts each of which is adapted to be connected to a drive axle.

It is well recognized in the art that the tractive efforts of a vehicle are substantially improved if driving torque is applied to more than one drive axle. This concept underlies the employment of known four wheel drive systems in military vehicles or trucks intended for operation over unimproved terrain. However, certain prohibitive conditions and problems arise in the provision of known four wheel drive systems which have thus far precluded their employment in pneumatic tired commercial and passenger vehicles.

If all four wheels are positively driven by the engine, a severe amount of tire scraping or cornering scrub occurs as the vehicle negotiates curves or turns. Under such conditions, the front wheels must run through an arc of greater radius than that of the rear wheels, and therefore tend to rotate faster than the rear wheels. Further, in such a system, slight differences in effective wheel radii caused by inevitable differences in tire inflation, tread wear or variations in loading result in the occurrence of what is known as circumferential scrub. Under such conditions, the wheels having smaller radii necessarily tend to rotate faster than those having larger radii while traversing the same distance. If the wheels are positively driven together at the same angular speed by the drive system, then on corners the front wheels are bodily scraped over the ground, and on straight travel the wheels having smaller radii are scraped. Tires will not long withstand such abuse. In addition, undue stresses or windup occurs in the driving parts and fuel consumption is excessive.

One approach to solving the problems inherent in such a system is to provide a manually operable clutch or disengageable gear enabling the front wheels of the vehicle to be selectively engaged or disengaged for positive drive effort. Thus, the front wheels would only be locked into engagement for four wheel drive when surface conditions would permit. Such engagement would normally occur when the vehicle was traveling on unpaved surfaces. When the vehicle was traveling over paved surfaces, the front wheels would be disengaged and the standard rear wheel drive would propel the vehicle.

Much effort has been devoted to another approach which is providing a third differential in a four wheel drive system such that front and rear drive shafts would serve respectively to drive front and rear differentials, the shafts being powered from the engine through a center or third differential. Such a differential system clearly permits overspeeding of any one or more of the wheels as a result of rounding corners or of certain wheels having a smaller effective radius than others.

Certain problems however, arise in connection with this type of system. For instance, if one set of wheels should encounter a slippery or icy patch of ground and lose all traction, they will spin freely and the differential action will cause the other set of wheels to exert no driving torque. Manually operable locking means have been incorporated into such three differential systems which, when engaged, eliminate differential action between the drive shaft and positively lock the driven parts together. These are, however, inherently so limited in effectiveness that they have never found any commercial acceptance.

Other four wheel drive systems have been proposed which incorporate a center differential which will automatically provide for locking out or inhibiting differential action whenever limited free ranges of differential action are exceeded. Such devices are operative to automatically restore such action when the tendency to exceed the range ceases. One such system is shown and described in U.S. Pat. No. 2,796,941 issued to Claude Hill.

As will be apparent, however, such a system requires the addition of many structural elements and results in a mechanism which is both costly and cumbersome.

The present invention is directed to providing a torque transfer mechanism which in the forward mode of operation will allow the front wheels to overspeed the rear wheels by any amount but will allow the rear wheels to overspeed the front wheels only by a predetermined minimum amount. The predetermined minimum amount will be determined as that amount necessary to compensate for differences in wheel radii or tire wear. The torque transfer mechanism of the present invention in the reverse mode of operation provides a drive torque to one drive axle with only a reduced amount of torque being transferred to the other drive axle.

This invention is adapted to provide such a result with the addition of a minimum number of operating parts and is further adapted to provide such a result in a most economical manner.

BRIEF DESCRIPTION OF THE DRAWINGS

FIG. 1 is a perspective view of one embodiment of the present multiple path drive system shown schematically on an automotive vehicle.

FIG. 2 is an enlarged view partially in section of the torque transfer mechanism.

FIG. 3 is a diagrammatic view of a portion of FIG. 2 showing an alternative embodiment.

DESCRIPTION OF THE PREFERRED EMBODIMENT

There is illustrated in FIG. 1, one type of automotive vehicle wherein the torque transfer mechanism of the present invention is particularly useful. The vehicle includes a prime mover 10 and an automatic transmission 11 connected to the prime mover. A torque transfer mechanism 12 is connected to the transmission 11 and is adapted to transmit torque to a front drive axle assembly 13 through a torque transmitting member here shown as a drive shaft 15 and to a rear drive axle assembly 16 through a torque transmitting member here shown as a drive shaft 17. The front axle assembly 13 and rear axle assembly 16 are adapted to drive front and rear pairs of traction wheels 20 and 21 respectively.

Referring now to FIG. 2 in which one embodiment of the torque transfer mechanism 12 is shown, the torque transfer mechanism includes a housing generally referred to as 22. A portion of the input shaft 23 is shown which is driven by the transmission 11. Driven by the shaft 23 is a planetary carrier 26 which forms one element of a differential gear mechanism 25.

The differential gear mechanism 25 includes the planetary carrier 26, a plurality of planetary gears 27 on the carrier 26, a sun gear 28 positioned concentric to and overlying the input shaft 23, and a ring gear 30 also positioned concentric to the central axis of the input shaft 23. Attached to the sun gear 28 for rotation therewith is a sleeve section 31 concentric to and overlying the shaft 23. The sleeve section 31 is adapted to rotate relative to the input shaft 23. Attached to the ring gear 30 is a supporting member 36 including a hub portion 37 having a central axis common to the input shaft 23. Attached to the hub portion 37 and axially extending therefrom is a hollow shaft 38 adapted to be connected to the drive shaft 17.

Disposed between the planetary carrier 26 and the sleeve section 31 of the sun gear 28 is a one-way driving means 40, here illustrated schematically as a sprag clutch. The sprag clutch is oriented to allow the sleeve section 31 to overspeed the planetary carrier 26 in one direction of rotation, that direction corresponding to the direction of rotation of the components when the vehicle is traveling in a forward direction. If the planetary carrier tends to overspeed the sun gear in the forward direction of rotation, the one-way driving means would lock the elements together thereby preventing differentiation between them.

A rotary drive element 41 here shown as a spur gear overlies sleeve section 31 in splined engagement therewith. Disposed in the lower end of the housing 22 is an output shaft 42 adapted to be connected to the drive shaft 15. An annular hub member 39 is splined to the output shaft 42 for rotation therewith. Also disposed in the lower end of the housing 22 is a rotary drive member 43 journaled for rotation in bearings 46 and connected to the rotary drive element 41 by means of a drive chain 44.

A friction clutch 45 is disposed between the rotary drive member 43 and the output shaft 42. The clutch 45 includes a series of longitudinal splines 50 defined in the rotary drive member 43. Positioned in the splines 50 are a series of friction discs 51. A similar series of splines 52 are defined in the hub member 39. A similar series of friction discs 53 are disposed in the splines 52 in the hub member 39, and when assembled, are interleaved between the friction discs 51.

An annular pressure applying means 55 overlies the output shaft 42 and is positioned internal to the periphery of the rotary drive member 43 and adjacent to an end wall 56 thereof. The pressure applying means 55 is axially slidable with respect to the end wall 56. A pressure chamber 57 is defined by and between the pressure applying means 55 and the end wall 56.

The automatic transmission 11 includes a source of fluid pressure 60, the structure and function of which are more clearly set forth in U.S. Pat. No. 3,165,946 issued to R. W. Wayman. The equivalent pressure source in that patent is identified by number 160 and called the front pump. Such a pressure source is common to almost every type of automatic transmission.

The pressure source 60 is shown in FIG. 2 connected to a forward or front clutch 61 of the automatic transmission 11 by means of a conduit 62. Valve means (not shown) associated with the pressure source 60 and transmission 11 are operative such that when the transmission is conditioned for forward drive operation, the valve means will direct fluid from the pressure source 60 to the front clutch 61 through conduit 62. The operation of such a valve means is shown and described in Column 23 of the previously mentioned Wayman U.S. Pat. No. 3,165,946. The valve is referred to as "manual selector valve 164". A conduit 63 connects the conduit 62 to a fluid inlet 65, defined in a cap 66 connected to the housing 22. A fluid conduit 67 is defined in the output shaft 42 and is in fluid communication with the fluid inlet 65 by means of a tubular member 68. A conduit 70 is defined by the output shaft 42, and connects the conduit 67 to a conduit 71 formed in the rotary drive member 43 which in turn is in communication with the pressure chamber 57.

A modified form of the hydraulic apply system is illustrated in FIG. 3. This system includes a separate manual selector valve 75 connected to the pressure source 60 by means of a conduit 76. The selector valve 75 is connected to the transmission shift linkage (not shown).

A valve assembly 78 is shown disposed between the manual selector valve 75 and the fluid inlet 65, the purpose of which will soon become apparent. The valve assembly 78 includes a housing 80, defining a pair of inlet ports 81 and 82 and an outlet port 83. The housing 80 further defines a pair of cylindrical bores 85 and 86 which bores are coaxial and in fluid communication with inlet ports 81 and 82 and outlet port 83. Bore 85 is of larger diameter than bore 86.

A valve member 87 including a land section 88, a land section 90 and a spool section 91 is shown slidably disposed within the housing 80, the land section 88 being within bore 85 and the land section 90 lying within bore 86. A pressure chamber 92 is defined in the bore 85 between an end 93 of the valve member 87 and an end 95 of the bore 85. A port 96 is formed in the housing 80 in communication with the pressure chamber 92. A bore 97 is defined in the housing 80 and houses a pressure chamber 98. An inlet port 100 is formed in the housing 80 in communication with the pressure chamber 98. A spring 101 is disposed in the bore 97 acting against the valve member 87.

The valve assembly 78 is in fluid communication with the manual selector valve 75 alternately through a fluid conduit 102 or a fluid conduit 103. A conduit 104 connects the manual selector valve 75 and the forward clutch 61. A conduit 106 connects the conduit 102 to inlet port 100. A conduit 107 connects the conduit 103 to inlet port 96.

The operation of the four wheel drive system shown in FIGS. 1 and 2 and described herein is as follows.

When forward motion of the vehicle is desired, the transmission selector lever is placed in one of the forward drive positions. The pressure source 60 is hydraulically connected in the clutch applying circuit through the valve means (not shown) such that it is operative to supply fluid pressure to the forward or front clutch 61 of the transmission 11 through conduit 62 and also to pressure chamber 57 of the friction clutch 45 through conduits 63, 68, 67, 70 and 71. The fluid pressure acts against pressure applying means 55 urging it axially to the left as shown in FIG. 2, thereby placing the friction clutch 45 in an engaged condition whereby torque can be transmitted from the rotary drive member 43 to the output shaft 42.

An input torque is delivered to the torque transfer mechanism 12 through the input shaft 23. The input shaft 23 rotates the planet carrier 26 which through the planet gears 27 distributes torque between the sun gear 28 and the ring gear 30. The ring gear 30, through supporting member 36, hub portion 37, and shaft 38 drives the drive shaft 17, the rear axle assembly 16 and ultimately the rear pair of traction wheels 21.

The sun gear 28 rotates the sleeve section 31, the rotary drive element 41 and, through the chain drive 44, the rotary drive member 43. The drive element 43 through the friction clutch 45 drives the hub member 39 and the output shaft 42, which drives the front drive shaft 15, the front drive axle assembly 13 and ultimately the front pair of traction wheels 20.

The geometry and design of the rotary drive elements 41 and 43, here shown as spur gears is such that gear 43 is of a slightly larger diameter than gear 41 and accordingly, has a greater number of teeth. For purposes of example, gear 41 is shown with 41 teeth and gear 43 with 43 teeth. Assuming now that the vehicle is being driven under normal straight ahead driving conditions, the front and rear pairs of traction wheels will be rotating at the same speed, which will cause the sun gear 28 to overspeed the planetary carrier 26 and the ring gear 30 by a predetermined percent. The one-way driving means 40 is oriented such that it will allow this overspeed when the vehicle is being driven in the forward mode of operation.

If the vehicle encounters a curve or must negotiate a turn which requires that the front wheels overspeed the rear by virtue of the larger arc through which they must travel, the sun gear 28 will overspeed the planetary carrier 26 and ring gear 30 by a still greater percent.

If conditions exist due to differences in tire or wheel radii that the rear wheels are overspeeding the front by a slight amount, the net effect on the differential gear system will be to increase the speed of the ring gear and planetary carrier thereby reducing the relative overspeed of the sun gear with respect to the planetary carrier and the ring gear. Such rear wheel overspeed will be allowed by the one-way driving means 40 until the planetary carrier is rotating at the same speed as the sun gear.

Under conditions where an excess amount of torque is supplied to the drive axles for a given road coefficient, the wheels carrying a lighter load will begin to slip. In standard front-engine vehicles, the rear wheels carry appreciably less weight than the front wheels and consequently will lose traction and slip before the front wheels. If such relative slippage of the rear wheels relative to the front wheels exceeds the design limit of 4-5 percent, the planetary carrier will tend to overspeed the sun gear locking up the one-way driving means and preventing any differentiation between the carrier and sun gear. If that situation occurs, the ring gear 30 will transmit torque to the planetary carrier 26, and through the one-way driving means 40 to the sun gear 28, the rotary drive elements 41 and 43, and the friction clutch 45 to the output shaft 42 and then to the front pair of traction wheels 20.

This transfers any additional torque which the rear wheels are unable to effectively utilize to the front pair of traction wheels in accordance with the road coefficient of friction versus percent slip at each drive axle. At a limiting value of total torque transmitted, both the front and rear axles will be utilizing substantially the maximum available tractive effort.

Thus a multiple path drive system has been provided which allows the front wheels to overspeed the rear wheels by any amount but which allows the rear wheels to overspeed the front wheels by only a predetermined percent at which point the differential gear mechanism will lockup transferring additional torque to the front wheels.

Absent the hydraulic apply system of the present invention, serious problems would occur when the vehicle was driven in the reverse direction. The one-way driving means would lockup for any tendency of the sun gear 28 to overspeed the planetary carrier 26 in the reverse direction which overspeed is inherent in the system as designed. The lockup would result in a tire scrub of approximately 5 percent and/or constant slippage in the friction clutch 45.

As previously described, however, the pressure source 60 is connected to the clutch applying circuit to provide fluid pressure for clutch engagement only when the transmission is in a forward mode of operation. When the gear selector lever of the automatic transmission 12 is placed in the reverse position, the pressure source 60 communicates no fluid pressure to the pressure chamber 57. The pressure applying means 55 moves axially to the right as shown in FIG. 2, releasing the friction clutch 45. In this mode of operation, torque is transmitted to the rear wheels only.

If the vehicle encounters conditions where it must be moved in reverse and the rear wheels are on a slippery surface, some torque will be transferred to the front wheels due to the slight inherent drag of the friction clutch 45.

The operation of the embodiment shown in FIG. 3 is substantially the same as for the embodiment shown in FIG. 2 and described herein except that the pressure source 60 is hydraulically connected in the clutch applying circuit such that the pressure source is operative to provide fluid pressure to the clutch engaging circuit in both forward and reverse and valve means are provided for applying a limited and substantially reduced amount of pressure to the pressure chamber 57 of the friction clutch 45 in the reverse mode of operation.

In the forward mode of operation, the pressure source 60 supplies fluid pressure to the manual selector valve 75 and then to the forward clutch 61 through conduit 104 and to valve assembly 78 through conduit 102. Fluid is also communicated to pressure chamber 98 through conduit 106 where it acts against the valve member 87 to urge it to the left as viewed in FIG. 3, thereby uncovering the entrance port 81 and blocking the entrance port 82. Fluid flows through the valve assembly from the entrance port 81 to exit port 83 and then to fluid inlet 65 to act to engage the friction clutch 45 as previously described.

In the reverse mode of operation, the pressure source 60 supplies fluid pressure to the manual selector valve 75 and then to the valve assembly 78 through conduit 103. Fluid is also communicated to pressure chamber 92 through conduit 107 where it acts against the valve member 87 to overcome the force of the spring 101 and urge the valve member to the right as viewed in FIG. 3. As valve member 87 moves to the right, the entrance port 82 is uncovered. Land section 88 partially blocks the outlet port 83 resulting in a substantially diminished pressure being transmitted to the pressure chamber 57 and thus the friction clutch 45 is only lightly engaged. Any tendency to import tire scrub to the vehicle wheels will be absorbed by slipping of the clutch.

Various of the features of the invention have been particularly shown and described, however, it should be obvious to one skilled in the art that various modifications may be made therein without departing from the scope of the invention.

What is claimed is:

1. A multiple path drive system for a vehicle having at least two pairs of traction wheels, a transmission conditionable for either forward or reverse drive and a plurality of drive axle assemblies including a plurality of torque transmitting members, each of said members connected to an axle assembly; a torque transfer mechanism comprising driven means for receiving an input torque from said transmission, a differential gear mechanism connected to said driven means including an input element driven by said driven means and a pair of output elements driven by said input element, said differential gear mechanism allowing relative rotation between said input element and each of said output elements, clutch means associated with at least one of said output elements, said clutch means including a driving member connected to said one of said output elements, a driven member connected to one of said torque transmitting members, and a pressure applying means actuable to urge said clutch means into an engaged condition; a source of fluid pressure associated with said transmission; means for receiving fluid pressure from said pressure source; valve means associated with said transmission operative when said transmission is conditioned for forward drive to direct fluid from said pressure source to fluid pressure receiving means and means connected between said fluid pressure receiving means and said pressure applying means such that fluid pressure is communicated to said pressure applying means to engage said clutch when said transmission is conditioned for forward drive.

2. A multiple path drive system as in claim 1 including one-way driving means disposed between any two elements of said differential gear mechanism and adapted to allow relative overspeed of one of said elements with respect to the other in a single direction of rotation.

3. A multiple path drive system as in claim 1 including one-way driving means disposed between said input element of said differential gear mechanism and said output element associated with said clutch means, said one-way driving means allowing relative overspeed of said output element with respect to said input element in a single direction of rotation.

4. A multiple path drive system as in claim 1 including a drive chain connecting said driving member to one of said output elements.

5. A multiple path drive system as in claim 1 in which said differential gear mechanism includes a planetary gear set, said input element comprising a planetary carrier driven by said driven means, and a plurality of planet gears on said planet carrier, said output elements comprising a ring gear and a sun gear meshing with said planet gears and driven by said planet carrier and said planet gears.

6. A multiple path drive system as in claim 1 in which said clutch means includes at least one friction surface associated with said driving member and at least one friction surface associated with said driven member.

7. A multiple path drive system as in claim 1 in which said transmission includes a hydraulic pump and a forward clutch wherein said source of fluid pressure is said hydraulic pump and said fluid pressure receiving means is said forward clutch.

8. A multiple path drive system for a vehicle operable in either forward or reverse directions, said vehicle having at least two pairs of traction wheels and an automatic transmission including a source of hydraulic pressure, said transmission conditionable for either forward or reverse drive, said multiple path drive system including a plurality of drive axle assemblies; a plurality of torque transmitting members, each of said members connected to an axle assembly; a torque transfer mechanism comprising driven means for receiving an input torque from said transmission, a differential gear mechanism connected to said driven means including an input element driven by said driven means; a first output element driven by said input element and connected to one of said torque transmitting members, a second output element driven by said input element and connected to the other of said torque transmitting members, said differential gear mechanism dividing torque between said pairs of traction wheels in a ratio relationship thereby allowing differentiation between said first and second output elements, one-way driving means connected between any two elements of said differential gear mechanism whereby when one of said elements overspeeds the other element, said one-way driving means locks said elements together for rotation permitting no differentiation therebetween but when said other element overspeeds said one element, a ratio relationship exists between said output elements for any speed variations, a rotary drive element connected to said second output element, a driven element driven by said rotary drive element, a driving element connectable to said one of said torque transmitting members, clutch means associated with said driven element and said driving element;

means for receiving hydraulic pressure from said hydraulic pressure source; valve means associated with said transmission operative when said transmission is conditioned for forward drive to direct hydraulic fluid from said pressure source to said pressure receiving means and means connected between said pressure receiving means and said clutch means such that hydraulic pressure is communicated to said clutch means to urge said clutch means into a fully engaged condition only when said transmission is conditioned for forward drive.

9. A multiple path drive system as in claim 8 in which the one-way driving means are disposed between said input element of said differential gear mechanism and said output element associated with said clutch means, said one-way driving means allowing relative overspeed of said output element with respect to said input element in a single direction of rotation.

10. A multiple path drive system as in claim 8 including a drive chain connecting said driving member to one of said output elements.

11. A multiple path drive system as in claim 8 in which said differential gear mechanism includes a planetary gear set, said input element comprising a planetary carrier driven by said driven means and a plurality of planet gears on said planet carrier, said output elements comprising a ring gear and a sun gear meshing with said planet gears and driven by said planet carrier and said planet gears.

12. A multiple path drive system as in claim 8 in which said clutch means includes at least one friction surface associated with said driving member and at least one friction surface associated with said driven member.

13. A multiple path drive system as in claim 8 in which said transmission includes a forward clutch wherein said fluid pressure receiving means is said forward clutch.

14. A multiple path drive system as in claim 1 including first and second fluid circuits connected between said valve means associated with said transmission and said clutch applying means whereby said valve means is operative to direct fluid pressure from said pressure source to said first fluid circuit when said transmission is conditioned for forward drive and to direct fluid pressure from said pressure source to said second fluid circuit when said transmission is conditioned for reverse drive.

15. A multiple path drive system as in claim 14 in which said second fluid circuit includes second valve means adapted to substantially decrease the pressure transmitted from said pressure source to said clutch applying means.

* * * * *